US012725795B2

(12) United States Patent
Lee et al.

(10) Patent No.: US 12,725,795 B2
(45) Date of Patent: Sep. 1, 2026

(54) POSITIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Youshin Lee, Osaka (JP); Ryuichi Natsui, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 753 days.

(21) Appl. No.: 17/800,357

(22) PCT Filed: Feb. 10, 2021

(86) PCT No.: PCT/JP2021/004883
§ 371 (c)(1),
(2) Date: Aug. 17, 2022

(87) PCT Pub. No.: WO2021/172011
PCT Pub. Date: Sep. 2, 2021

(65) Prior Publication Data

US 2023/0053476 A1 Feb. 23, 2023

(30) Foreign Application Priority Data

Feb. 28, 2020 (JP) ................................ 2020-033977

(51) Int. Cl.
*H01M 4/525* (2010.01)
*H01M 4/485* (2010.01)
(Continued)

(52) U.S. Cl.
CPC .......... *H01M 4/525* (2013.01); *H01M 4/485* (2013.01); *H01M 4/505* (2013.01);
(Continued)

(58) Field of Classification Search
CPC ...... H01M 4/525; H01M 4/505; H01M 50/46; H01M 4/485; H01M 10/0525; H01M 2004/028
See application file for complete search history.

(56) References Cited

U.S. PATENT DOCUMENTS

2005/0019662 A1* 1/2005 Suhara .................. C01G 51/42 429/231.95
2006/0046142 A1* 3/2006 Kasai .................. H01M 4/505 429/223
(Continued)

FOREIGN PATENT DOCUMENTS

JP 4197002 B2 12/2008
JP 2017-33817 A 2/2017
(Continued)

OTHER PUBLICATIONS

Machine Translation Relied Upon for WO-2015098064-A1. (Year: 2015).*
(Continued)

*Primary Examiner* — Marla D McConnell
*Assistant Examiner* — Olivia A Jones
(74) *Attorney, Agent, or Firm* — WHDA, LLP

(57) ABSTRACT

This positive-electrode active material for a non-aqueous electrolyte secondary battery contains a lithium and transition metal composite oxide represented by the composition formula: $Li_xMn_yNi_xGe_aM_bO_{2-c}F_c$ (where, M is at least one elements selected from Ti, Co, Si, Al, Nb, W, Mo, P, Ca, Mg,
(Continued)

Sb, Na, B, V, Cr, Fe, Cu, Zn, Sr, Zr, Ru, K, and Bi; $1.0<x\leq1.2$; $0.4\leq y\leq0.8$; $0\leq z\leq0.4$; $0<a<0.01$; $0<b<0.03$; $0<c<0.1$; and $x+y+z+a+b\leq2$).

3 Claims, 1 Drawing Sheet

(51) Int. Cl.

*H01M 4/505* (2010.01)
*H01M 10/0525* (2010.01)
*H01M 50/46* (2021.01)
*H01M 4/02* (2006.01)

(52) U.S. Cl.

CPC ....... *H01M 10/0525* (2013.01); *H01M 50/46* (2021.01); *H01M 2004/028* (2013.01)

(56) References Cited

U.S. PATENT DOCUMENTS

2008/0226988 A1* 9/2008 Minami ................ H01M 10/44 429/218.1
2013/0209871 A1 8/2013 Kato et al.
2015/0214550 A1* 7/2015 Song ..................... H01M 4/505 429/231.1
2017/0040594 A1 2/2017 Yamaki et al.
2018/0351199 A1* 12/2018 Maeda .................... H01M 4/58
2019/0221838 A1 7/2019 Ishikawa et al.
2019/0260017 A1* 8/2019 Yoo .................. H01M 10/0525
2020/0020943 A1 1/2020 Natsui et al.

FOREIGN PATENT DOCUMENTS

JP 2018-77965 A 5/2018
JP 2018-152256 A 9/2018
WO WO-2015098064 A1 * 7/2015 ............. C01G 51/50

OTHER PUBLICATIONS

International Search Report dated Apr. 13, 2021, issued in counterpart International Application No. PCT/JP2021/004883 (2 pages).
Extended (Supplementary) European Search Report dated Jul. 28, 2023, issued in counterpart EP Application No. 21760449.5. (6 pages).

* cited by examiner

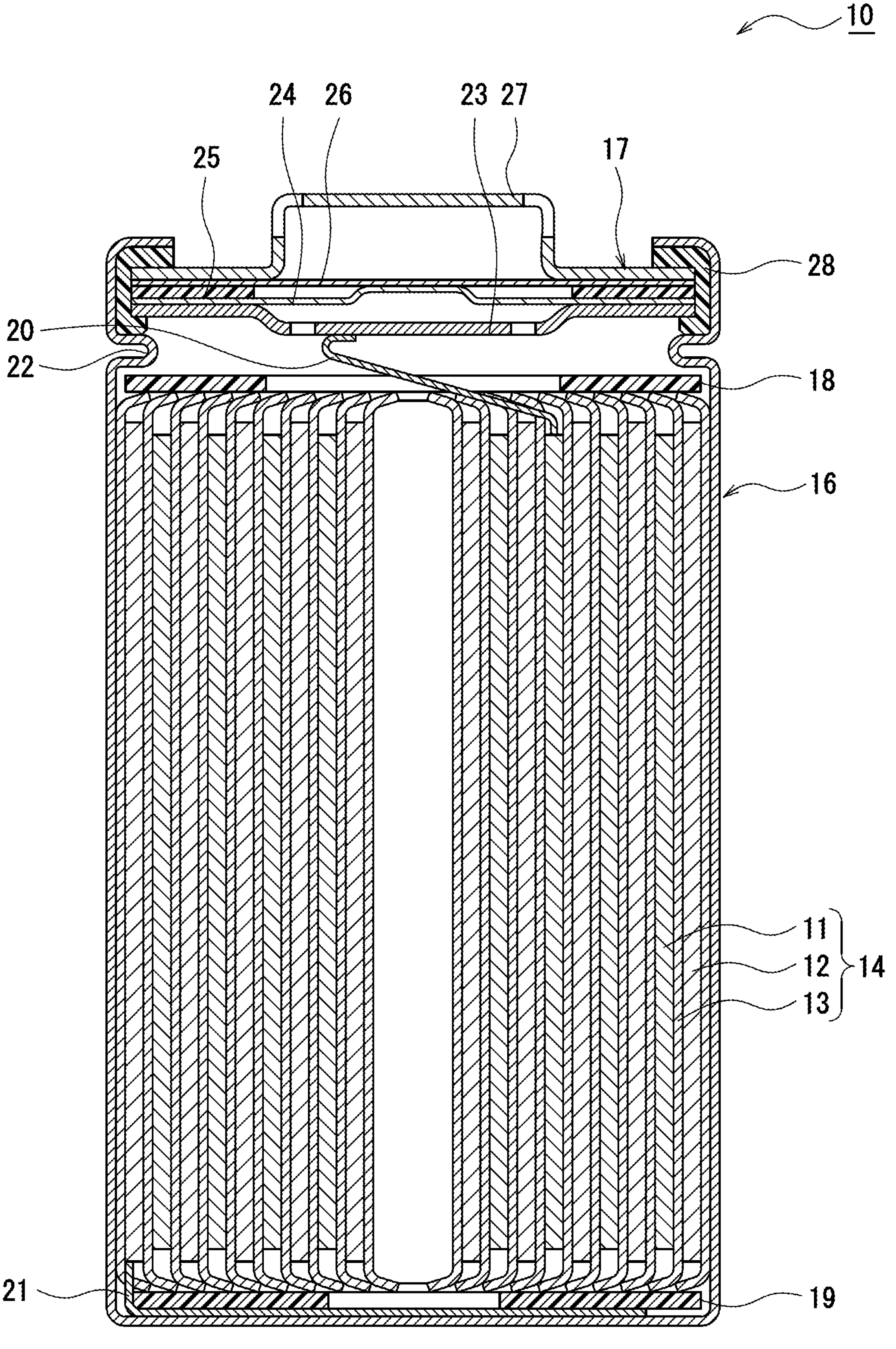
10
24
26
23
27
25
17
28
20
22
18
16
11
12
14
13
21
19

POSITIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/004883 filed on Feb. 10, 2021 which claims the benefit of priority under 35 U.S.C. § 119 (a) of Japanese Patent Application No. 2020-033977 filed in Japan on Feb. 28, 2020, the contents of which are incorporated herein by reference.

TECHNICAL FIELD

The present disclosure relates to a positive electrode active material for a non-aqueous electrolyte secondary battery, and to a non-aqueous electrolyte secondary battery which uses the positive electrode active material.

BACKGROUND

In non-aqueous electrolyte secondary batteries such as lithium ion batteries, a positive electrode active material significantly affects battery performances such as input/output characteristic, capacity, cycle characteristic, or the like. For the positive electrode active material, in general, a lithium-transition metal composite oxide which contains a metal element such as Ni, Co, Mn, Al, or the like, is used Because properties of the lithium-transition metal composite oxides significantly vary depending on compositions thereof there have been various studies on a type and an amount of an element to be added.

For example, Patent Literature 1 discloses a positive electrode active material for a non-aqueous electrolyte secondary battery, wherein the positive electrode active material is represented by a composition formula $Li_xNi_{1-y}Co_yM_zO_{2-a}X_b$, a lattice constant of an a axis measured by X-ray diffraction is 2.81~2.91 Å, the lattice constant of a c axis is 13.7~14.4 Å, and a ratio of a diffraction peak intensity of a (104) plane with respect to a peak intensity of a (003) plane is 0.3~0.8.

CITATION LIST

Patent Literature

PATENT LITERATURE 1: JP 4197002 B

SUMMARY

There has also been proposed a lithium-excess composite oxide in which a molar ratio of Li with respect to the transition metal exceeds 1. The lithium-excess composite oxides are highly expected as next-generation positive electrode active materials of high capacity, but there remains problems such as that the transition metal tends to easily elute. While it is known that the elution of the transition metal can be suppressed by adding F to the lithium-excess composite oxide and the endurance can be improved, there is a problem in that, when charging and discharging are repeated, an operation voltage is reduced, and this problem cannot be resolved by adding F.

According to one aspect of the present disclosure, there is provided a positive electrode active material for a non-aqueous electrolyte secondary battery, including a lithium-transition metal composite oxide represented by a composition formula $Li_xMn_yNi_zGe_aM_bO_{2-c}F_c$ (wherein M is at least one element selected from Ti, Co, Si, Al, Nb, W, Mo, P, Ca, Mg, Sb, Na, B, V, Cr, Fe, Cu, Zn, Sr, Zr, Ru, K, and Bi, $1.0<x\leq1.2$, $0.4\leq y\leq0.8$, $0\leq z\leq0.4$, $0<a<0.01$, $0<b<0.03$, $0<c<0.1$, and $x+y+z+a+b\leq2$).

According to another aspect of the present disclosure, there is provided a non-aqueous electrolyte secondary battery including a positive electrode including the positive electrode active material, a negative electrode, a separator interposed between the positive electrode and the negative electrode, and a non-aqueous electrolyte.

A lithium-excess positive electrode active material according to an aspect of the present disclosure has high voltage maintenance percentage and superior cycle characteristic.

BRIEF DESCRIPTION OF DRAWINGS

FIG. 1 is a cross-sectional diagram of a non-aqueous electrolyte secondary battery according to an embodiment of the present disclosure.

DESCRIPTION OF EMBODIMENTS

When F is added to the lithium-excess composite oxide as described above, although the endurance of the composite oxide can be improved through suppression of the elution of the transition metal, the effect is not sufficient, and a further improvement is desired. As a result of studies by the present inventors, it was found that an addition of Ge contributes to improvement of the endurance, but the improvement effect is small with the addition of Ge alone. It may be considered that Ge stabilizes the structure of the composite oxide by suppressing detachment of oxygen.

The present inventors have further eagerly studied, and found that the endurance can be significantly improved and a voltage maintenance percentage dining charging and discharging can be improved by adding Ge and one or more particular element to a lithium-excess, F-containing composite oxide which contains at least Mn as the transition metal.

A positive electrode active material for a non-aqueous electrolyte secondary battery and a non-aqueous electrolyte secondary battery which uses the positive electrode active material according to an embodiment of the present disclosure will now be described in detail with reference to the drawings. Selective combination of a plurality of embodiments and alternative configurations described below is contemplated from the beginning.

In the following, a circular cylindrical battery in which a rolled type electrode assembly 14 is housed in an outer housing can 16 of a circular cylindrical shape with a bottom will be exemplified. However, the outer housing is not limited to the circular cylindrical outer housing can, and may alternatively be, for example, a rectangular outer housing can (rectangular battery), a coin-shape outer housing can (coin-shape battery), or an outer housing (laminated battery) formed from laminated sheets including a metal layer and a resin layer. Alternatively, the electrode assembly may be a layered type electrode assembly in which a plurality of positive electrodes and a plurality of negative electrodes are alternately layered with separators therebetween.

FIG. 1 is a cross-sectional diagram of a non-aqueous electrolyte secondary battery 10 according to an embodiment of the present disclosure. As shown in FIG. 1, the non-aqueous electrolyte secondary battery 10 includes the electrode assembly 14 of the rolled type, a non-aqueous electrolyte, and the outer housing can 16 which houses the electrode assembly 14 and the non-aqueous electrolyte. The electrode assembly 14 includes a positive electrode 11, a negative electrode 12, and a separator 13, and has a rolled structure in which the positive electrode 11 and the negative electrode 12 are rolled in a spiral form with the separator 13 therebetween. The outer housing can 16 is a metal container having a circular cylindrical shape with a bottom, which is opened in one side in an axial direction, and the opening of the outer housing can 16 is blocked by a sealing assembly 17. In the following, for convenience of description, a side of the battery near the sealing assembly 17 will be referred to as an "upper side", and a side near a bottom of the outer housing can 16 will be referred to as a "lower side".

The non-aqueous electrolyte includes a non-aqueous solvent, and an electrolyte salt dissolved in the non-aqueous solvent. For the non-aqueous solvent, for example, esters, ethers, nitriles, amides, or a mixed solvent of two or more of these solvents is used. The non-aqueous solvent may include a halogen-substituted product in which at least a part of hydrogens of the solvent described above is substituted with a halogen atom such as fluorine. For the electrolyte salt, for example, a lithium salt such as $LiPF_6$ is used. The non-aqueous electrolyte is not limited to a liquid electrolyte, and may alternatively be a solid electrolyte.

Each of the positive electrode 11, the negative electrode 12, and the separator 13 of the electrode assembly 14 is a band-shape, elongated element, and is alternately layered in a radial direction of the electrode assembly 14 by being rolled in the spiral form. The negative electrode 12 is formed in a slightly larger size than the positive electrode 11 in order to prevent deposition of lithium. That is, the negative electrode 12 is formed longer than the positive electrode 11 in a longitudinal direction and a width direction (short side direction. Two separators 13 are formed in a slightly larger size than at least the positive electrode 11, and are placed, for example, to sandwich the positive electrode 11. The electrode assembly 14 has a positive electrode lead 20 connected to the positive electrode 11 by welding or the like, and a negative electrode lead 21 connected to the negative electrode 12 by welding or the like.

Insulating plates 18 and 19 are placed respectively above and below the electrode assembly 14. In the example structure shown in FIG. 1, the positive electrode lead 20 extends through a through hole of the insulating plate 18 toward the side of the sealing assembly 17, and the negative electrode lead 21 extends to the side of the bottom of the outer housing can 16 through an outer side of the insulating plate 19. The positive electrode lead 20 is connected to a lower surface of an internal terminal plate 23 of the sealing assembly 17 by welding or the like, and a cap 27 which is a top plate of the sealing assembly 17 electrically connected to the internal terminal plate 23 serves as a positive electrode terminal. The negative electrode lead 21 is connected to an inner surface of the bottom of the outer housing can 16 by welding or the like, and the outer housing can 16 serves as a negative electrode terminal.

A gasket 28 is provided between the outer housing can 16 and the sealing assembly 17, so as to secure airtightness of the inside of the battery. On the outer housing can 16, a groove portion 22 is formed by a part of a side surface portion being protruded to the inner side, and supports the sealing assembly 17. The groove portion 22 is desirably formed in an annular shape along a circumferential direction of the outer housing can 16, and supports the sealing assembly 17 with the upper surface thereof. The sealing assembly 17 is fixed at an upper part of the outer housing can 16 by the groove portion 22 and an opening end of the outer housing can 16 fastened on the sealing assembly 17.

The sealing assembly 17 has a structure in which the internal terminal plate 23, a lower vent member 24, an insulating member 25, an upper vent member 26, and the cap 27 are layered in this order from the side of the electrode assembly 14. The members of the sealing assembly 17 have, for example, a circular disk shape or a ring shape, and members other than the insulating member 25 are electrically connected to each other. The lower vent member 24 and the upper vent member 26 are connected to each other at respective center parts, and the insulating member 25 interposes between peripheral parts of the vent members. When an inner pressure of the battery increases due to abnormal heat generation, the lower vent member 24 deforms to press the upper vent member 26 upward toward the cap 27 and ruptures, and a current path between the lower vent member 24 and the upper vent member 26 is shut out. When the inner pressure further increases, the upper vent member 26 ruptures, and gas is discharged from an opening of the cap 27.

The positive electrode 11, the negative electrode 12, and the separator 13 forming the electrode assembly 14 will now be described in detail. In particular, a positive electrode active material included in the positive electrode 11 will be described in detail.

[Positive Electrode]

The positive electrode 11 comprises a positive electrode core and a positive electrode mixture layer provided over a surface of the positive electrode core. For the positive electrode core, there may be employed a foil of a metal which is stable within a potential range of the positive electrode 11 such as aluminum and an aluminum alloy, a film on a surface layer of which the metal is placed, or the like. The positive electrode mixture layer includes a positive electrode active material, a conductive agent, and a binder agent, and is desirably provided on both surfaces of the positive electrode core. The positive electrode 11 can be produced, for example, by applying a positive electrode mixture slurry including the positive electrode active material, the conductive agent, the binder agent, or the like over the positive electrode core, drying the applied film, and compressing the dried film to form the positive electrode mixture layer over both surfaces of the positive electrode core.

As the conductive agent included in the positive electrode mixture layer, there may be exemplified carbon materials such as carbon black, acetylene black, Ketjen black, graphite, or the like. As the binder agent included in the positive electrode mixture layer, there may be exemplified a fluororesin such as polytetrafluoroethylene (PTFE), polyvinylidene fluoride (PVdF), polyacrylonitrile (PAN), a polyimide resin, an acrylic resin, a polyolefin resin, or the like. These resins may be used in combination with a cellulose derivative such as carboxymethyl cellulose (CMC) or a salt thereof polyethylene oxide (PEO), or the like.

The positive electrode active material includes a lithium-transition metal composite oxide represented by a composite formula $Li_xMn_yNi_zGe_aM_bO_{2-c}F_c$ (wherein M is at least one element selected from Ti, Co, Si, Al, Nb, W, Mo, P, Ca, Mg, Sb, Na, B, V, Cr, Fe, Cu, Zn, Sr, Zr, Ru, K, and Bi, $1.0<x\leq1.2$, $0.4\leq y\leq0.8$, $0\leq z\leq0.4$, $0<a<0.01$, $0<b<0.03$, $0<c<0.1$, and $x+y+z+a+b<\leq 2$). The composite oxide is a Li-excess material in which a molar ratio of Li with respect to the transition metal exceeds 1, and a predetermined amount of fluoride ions are introduced so that a part of O is replaced with F.

The positive electrode active material has the composite oxide represented by the above-described composition formula as a primary composition. Here, a primary composition means a composition having the highest mass ratio among the constituting compositions of the composite oxide. In the positive electrode 11, as the positive electrode active material, composite oxides other than the composite oxide represented by the above-described composition formula (for example, a composite oxide which is not Li-excess, or a composite oxide which does not contain fluoride ions) may be additionally provided, but a content of the above-described composite oxide is desirably greater than or equal to 50 mass %, and may be substantially 100 mass %. The composition of the composite oxide can be measured using an ICP emission spectrometry device (iCAP 6300 manufactured by Thermo Fisher Scientific).

The lithium-transition metal composite oxide represented by the above-described composition formula may contain Ni in addition to Li, Mn, and Ge. Further, the lithium-transition metal composite oxide contains, as necessary compositions, two or more elements selected from Ti. Co, Si, Al, Nb, W, Mo, P, Ca, Mg, Sb, Na, B, V, Cr, Fe, Cu, Zn, Sr, Zr, Ru, K, and Bi. Of these, Ti, Co, Nb, Sr, Mg, Al, Si, and W are desirable.

In the above-described composition formula, M is particularly desirably at least one element selected from Co and Al. That is, M is one of (1) Co, (2) Al, or (3) Co and Al. A molar ratio (b) of M is desirably in a range of $0<b<0.02$, is more desirably in a range of $0.001\leq b\leq 0.015$, and is particularly desirably in a range of $0.0002\leq b\leq 50.010$. When the element M is a combination selected from (1)~(3) described above, the improvement effect of the voltage maintenance percentage is more significant.

In the above-described composition formula, a molar ratio (x) of Li is in a range of $1.0<x\leq 1.2$, and is desirably in a range of $1.1\leq x\leq 1.2$. A molar ratio (y) of Mn is in a range of $0.4\leq y\leq 0.8$, and is desirably in a range of $0.45\leq y\leq 0.6$. A molar ratio (a) of Ge is in a range of $0\leq a\leq 0.01$, is desirably in a range of $0.001\leq a\leq 0.007$, and is more desirably in a range of $0.002\leq a\leq 0.005$. When the molar ratios of Li, Mn, and Ge are in these ranges, the improvement effect of the voltage maintenance percentage is more significant. Ni is an optional composition, and is desirably contained, for example, in an amount in a range of $0.05\leq z\leq 0.3$.

In the lithium-transition metal composite oxide represented by the above-described composition formula, a total molar amount ($x+y+z+a+b$) of Li, Mn, Ni, Ge, and M is 2 or less, and is desirably 2. That is, the composite oxide is desirably a Li-excess composite oxide, and not a cation-excess composite oxide. A molar ratio (c) of F is in a range of $0<c\leq 0.1$, and is desirably in a range of $0.05\leq x\leq 0.085$. By adding a predetermined amount of F, the elution of the transition metal can be suppressed and the endurance can be improved A specific example of a desirable lithium-transition metal composite oxide is a lithium-excess, F-containing composite oxide which contains Mn, Ni, and Ge, and contains at least one of Co or Al. The composite oxide substantially does not contain, for example, elements other than Mn, Ni, Ge, Co, Al, Li, O, and F. A molar ratio of each of Co and Al is desirably less than or equal to 0.01, is more desirably in a range of 0.001~0.007, and is particularly desirably in a range of 0.002~0.005, and is, for example, less than or equal to a molar ratio of Ge.

The lithium-transition metal composite oxide of the embodiment can be synthesized by, for example, mixing a carbonate containing Mn and Ni, compounds respectively containing Ge, Co, Al, or the like (for example, germanium oxide, cobalt sulfate, aluminum hydroxide, or the like), and lithium fluoride (LIF), and baking the mixture. An example of the baking condition is 700~900° C.×10~30 hours.

[Negative Electrode]

The negative electrode 12 includes a negative electrode core and a negative electrode mixture layer provided over a surface of the negative electrode core. For the negative electrode core, there may be employed a foil of metal stable within a potential range of the negative electrode 12 such as copper, a film on a surface layer of which the metal is placed, or the like. The negative electrode mixture layer includes a negative electrode active material and a binder agent, and is desirably provided over both surfaces of the negative electrode core. The negative electrode 12 can be produced, for example, by applying a negative electrode mixture slurry including the negative electrode active material, the conductive agent, the binder agent, or the like over a surface of the negative electrode core, drying the applied film, and compressing the dried film, to form the negative electrode mixture layer over both surfaces of the negative electrode core.

The negative electrode mixture layer includes, as the negative electrode active material, for example, a carbon-based active material which reversibly occludes and releases lithium ions. Desirable examples of the carbon-based active material include graphites such as natural graphites such as flake graphite, massive graphite, amorphous graphite, or the like, and artificial graphites such as massive artificial graphite (MAG), graphitized meso-phase carbon microbeads (MCMB), or the like. Alternatively, an Si-based active material formed from at least one of Si or a Si-containing compound may be used for the negative electrode active material, or the carbon-based active material and the Si-based active material may be used in a combined manna.

As the conductive agent included in the negative electrode mixture layer, similar to the case of the positive electrode 11, there may be employed carbon materials such as carbon black, acetylene black, Ketjen black, graphite, or the like. As the binder agent included in the negative electrode mixture layer, similar to the case of the positive electrode 11, a fluororesin, PAN, polyimide, an acrylic resin, polyolefin, or the like may be employed, but desirably, styrene-butadiene rubber (SBR) is employed. The negative electrode mixture layer desirably further contains CMC or a salt thereof, a polyacrylic acid (PAA) or a salt thereof, polyvinyl alcohol (PVA), or the like. In particular, desirably, SBR, CMC or the salt thereof, and PAA or the salt thereof are used in a combined manner.

[Separator]

For the separator 13, a porous sheet having an ion permeability and an insulating property is employed. Specific examples of the porous sheet include a microporous thin film, a woven fabric, a non-woven fabric, or the like. As a material forming the separator 13, desirably, polyolefin such as polyethylene, polypropylene, and a copolymer of ethylene and a olefin, cellulose, or the hike is employed. The separator 13 may have a single-layer structure or a layered structure. On a surface of the separator 13, a heat resistive layer including inorganic particles, and a heat resistive layer formed from a resin of a high heat resistivity such as an aramid resin, polyimide, polyamideimide, or the like may be formed.

EXAMPLES

The present disclosure will now be described in further detail with reference to Examples. The present disclosure, however, is not limited to the Examples.

Example 1

[Synthesis of Lithium-Transition Metal Composite Oxide]

A carbonate containing Mn and Ni in a molar ratio of 2:1, germanium oxide, aluminum hydroxide, and lithium fluoride were mixed, and the mixture was baked at a temperature of 800° C. for 20 hours under an oxygen gas stream, to obtain a lithium-transition metal composite oxide represented by a composition formula $$Li_{1.167}Mn_{0.55}Ni_{0.275}Ge_{0.002}Al_{0.002}O_{1.92}F_{0.08}.$$

[Production of Positive Electrode]

The lithium-transition metal composite oxide described above was used as the positive electrode active material. The positive electrode active material, acetylene black, and polyvinylidene fluoride were mixed with a solid content mass ratio of 7:2:1, N-methyl-2-pyrrolidone (NMP) was used as a dispersion medium, and a positive electrode mixture slurry was prepared. Then, the positive electrode mixture slurry was applied over a positive electrode core formed from an aluminum foil, the applied film was dried, the dried film was compressed, and the resulting structure was cut in a predetermined electrode size, to produce a positive electrode.

[Preparation of Non-Aqueous Electrolyte Solution]

Ethylene carbonate (EC), ethyl methyl carbonate (EMC), and dimethyl carbonate (DMC) were mixed in a predetermined volume ratio. $LiPF_6$ was added to the mixture solvent, to obtain a non-aqueous electrolyte solution.

[Production of Test Cell]

The above-described positive electrode and a negative electrode formed from a lithium metal foil were placed opposing each other with a separator therebetween, to from an electrode assembly, and the electrode assembly was housed in an outer housing can of a coin shape. After the above-described non-aqueous electrolyte solution was injected into the outer housing can, the outer housing can was sealed, to obtain a test cell (non-aqueous electrolyte secondary battery) of a coin shape.

For the test cell, voltage maintenance percentage was assessed through the following method. Assessment results are shown in TABLE 1, along with compositions of the positive electrode active material.

[Assessment of Voltage Maintenance Percentage]

The test cell was charged and discharged under the charge and discharge conditions described below, and a voltage maintenance percentage was calculated by the following formula based on an average operation voltage at 20th cycle (V20) and an average operation voltage at 1st cycle (V1).

$$\text{Voltage maintenance percentage} = (V20/V1) \times 100$$

Charge and discharge conditions: The test cell was CC-charged with a constant current of 0.05° C. until a battery voltage reached 5.2 V, the charging was stopped for 20 minutes, the test cell was CC-discharged with a constant current of 0.05° C. until the battery voltage reached 2.5 V, and this charge/discharge cycle was repeated for 20 times.

Example 2, Comparative Example 1

Test cells were produced in a manner similar to Example 1 except that types of raw materials and mixture ratios of the raw materials were changed in the synthesis of the lithium-transition metal composite oxide so that the compositions shown in TABLE 1 were obtained (contents of Ni and Mn were identical to those in Example 1). The voltage maintenance percentages of the test cells were assessed.

TABLE 1

| | MOLAR RATOS OF Ge AND ELEMENT M IN POSITIVE ELECTRODE ACTIVE MATERIAL | | | VOLTAGE PERCENTAGE (%) |
|---|---|---|---|---|
| | Ge | Co | Al | MAINTENANCE |
| COMPARATIVE EXAMPLE 1 | 0.0025 | | | 97.0 |
| EXAMPLE 1 | 0.0025 | | 0.0025 | 97.6 |
| EXAMPLE 2 | 0.0025 | 0.0025 | 0.0025 | 98.1 |

As shown in TABLE 1, the test cells of Examples, in which a positive electrode active material was used in which at least one element selected from Co and Al was added to the lithium-excess, F-containing composite oxide containing Mn, Ni, and Ge, had higher voltage maintenance percentages than the test cell of Comparative Example. In particular, the positive electrode active material of Example 2 which contained Ge, Al, and Co resulted in significant improvement in the voltage maintenance percentage.

As described, the voltage maintenance percentage can be significantly improved by adding at least one particular element selected from Co, Al, or the like, along with Ge, to the lithium-excess, F-containing composite oxide containing at least Mn as the transition metal.

REFERENCE SIGNS LIST

10 non-aqueous electrolyte secondary battery
11 positive electrode
12 negative electrode
13 separator
14 electrode assembly
16 outer housing can
17 sealing assembly
18, 19 insulating plate
20 positive electrode lead
21 negative electrode lead
22 groove portion
23 internal terminal plate

24 lower vent member
25 insulating member
26 upper vent member
27 cap
28 gasket

The invention claimed is:

1. A positive electrode active material for a non-aqueous electrolyte secondary battery, the positive electrode active material comprising:

a lithium-transition metal composite oxide consisting of a compound represented by a composition formula $Li_xMn_yNi_zGe_aM_bO_{2-c}F_c$, wherein M consists of Co and Al, $1.0<x\leq 1.2$, $0.4\leq y\leq 0.8$, $0.05\leq z\leq 0.4$, $0<a<0.01$, $0.0002<b<0.010$, $0<c<0.1$, and $x+y+z+a+b\leq 2$;

and wherein a molar ratio of Co and a molar ratio of Al in the compositional formula are identical.

2. The positive electrode active material for the non-aqueous electrolyte secondary battery according to claim 1, wherein in the composition formula $Li_xMn_yNi_zGe_aM_bO_{2-c}F_c$, a molar ratio (a) of Ge is in a range of $0.002\leq a\leq 0.005$.

3. A non-aqueous electrolyte secondary battery comprising:

a positive electrode including the positive electrode active material according to claim 1;

a negative electrode;

a separator interposed between the positive electrode and the negative electrode; and a non-aqueous electrolyte.

* * * * *